(12) United States Patent
Dreyfus

(10) Patent No.: US 6,654,011 B1
(45) Date of Patent: Nov. 25, 2003

(54) TRIM OPERATION BASED ON ENHANCED FACE DEFINITION

(75) Inventor: Jean-Pierre Dreyfus, Maisons-Laffitte (FR)

(73) Assignee: Dassault Systemes, Suresnes Cedex (FR)

( * ) Notice: Subject to any disclaimer, the term of this patent is extended or adjusted under 35 U.S.C. 154(b) by 0 days.

(21) Appl. No.: 09/415,888

(22) Filed: Oct. 8, 1999

(51) Int. Cl.⁷ .............................................. G06T 17/00
(52) U.S. Cl. ....................... 345/420; 345/423; 345/424; 345/629; 700/98
(58) Field of Search ................................. 345/419, 420, 345/423, 424, 629; 700/98

Primary Examiner—Mark Zimmerman
Assistant Examiner—Kimbinh T. Nguyen
(74) Attorney, Agent, or Firm—Clifford Chance US LLP

(57) ABSTRACT

A method, apparatus and system for use in CAD/CAM design in which two or more bodies may be combined to form an assembly. When the assembly is formed, the two bodies intersect so that the volume of the assembly consists of cells containing volume common to both bodies, cells containing volume originating solely from one of the bodies, and cells containing volume originating solely from the other body. Often it is desirable to remove a portion of the assembly consisting of a cell originating solely from one of the bodies. In an existing system this can be done by selecting a face of such a cell, provided however, that said face has not been created by dividing one of the faces of the original bodies. If a divided face is selected, additional user inputs are required before the removal is executed. According to the present invention, divided faces can be selected directly by the user, without the need for further processing. The preset invention makes use of topology logs to keep track of all faces in the assembly. This alleviates the necessity for extra user input when a divided face is selected.

19 Claims, 11 Drawing Sheets

BODY A∪B: LOG A∪B
(c1, c2, c3, c4, c5, c6, c7, .......c14)

c1 = SIMPLIFIED FACE, PARENTS ARE a3 AND b3
c2 = UNCHANGED FACE, PARENT IS b1
c3 = SPLIT FACE, PARENT IS b2, SPLITTING FACE IS a1
c4 = SPLIT FACE, PARENT IS a1, SPLITTING FACE IS b2
c5 = UNCHANGED FACE, PARENT IS a2
c6 = SPLIT FACE, PARENT IS b2, SPLITTING FACE IS a4
  (NOT SHOWN IN FIG. 5)
c7 = SPLIT FACE, PARENT IS a1, SPLITTING FACE IS b4
  (NOT SHOWN IN FIG. 5)
ETC. TO c14

BODY A∪B: LOG A∪B
(c1, c2, c3, c4, c5, c6, c7, .......c14)

c1 = SIMPLIFIED FACE, PARENTS ARE a3 AND b3
c2 = UNCHANGED FACE, PARENT IS b1
c3 = SPLIT FACE, PARENT IS b2, SPLITTING FACE IS a1
c4 = SPLIT FACE, PARENT IS a1, SPLITTING FACE IS b2
c5 = UNCHANGED FACE, PARENT IS a2
c6 = SPLIT FACE, PARENT IS b2, SPLITTING FACE IS a4
    (NOT SHOWN IN FIG. 5)
c7 = SPLIT FACE, PARENT IS a1, SPLITTING FACE IS b4
    (NOT SHOWN IN FIG. 5)
ETC. TO c14

TRIM OPERATION BASED ON ENHANCED FACE DEFINITION

BACKGROUND

The present invention relates to computer software utility programs in the field of computer aided design (CAD), computer aided manufacturing (CAM), computer aided engineering (CAE) and program data management (PDM II) software systems, and more particularly to part design and assembly applications in such systems.

In part design and assembly operations a part is often constructed by combining two or more bodies. For example, such bodies can be in the form of simple three-dimensional shapes such as cubes, spheres, cylinders, rectangular boxes or cones, or more complex shapes. Such bodies are defined, among other ways, by defining the outer shell of the body, which is composed of a number of "faces". Thus, for example, a body having the shape of a cube would have six faces, each of which is a square.

In existing CAD systems, parts are often assembled by combining two bodies so that the volumes of the two bodies intersect. This is shown, for example, in FIG. 1 where two rectangular boxes intersect. In part design it is often desirable to remove, or conversely, to keep certain portions of a body when that body is assembled with another body. For example, referring to FIG. 1, a designer may wish to remove a portion of the assembly, such as the portion labeled 10, while keeping the rest of the assembly. In a known CAD/CAM/CAE system sold by Dassault Systemes of Suresnes, France, under the name CATIA®, this can be accomplished through an operation known as a TRIM operation.

The first step in the TRIM operation is the step of dividing the volumes of the two bodies into sets of new volumes, or cells. The cells fall into three groups: Group I, cells having volume originating solely from Body A; Group II, cells having volume originating solely from Body B; and Group III, cells having volume common to both bodies. This step is referred to as the "CutBodies" operation. As shown in FIG. 1, the assembly of the two rectangular boxes as shown results in the creation of five "cells". Cells 12 and 13 originate exclusively from the first body, Body A. Cells 10 and 11 originate exclusively from the second body, Body B, and cell 14 originates from both Body A and Body B. As can be seen, the five cells each have a set of faces which define the cells.

The second step of the TRIM operation comprises keeping or removing cells so as to create a finished assembly meeting the user's specification according to Boolean operations. Specifically, if the user specifies that the first body should be added to the second body, then all cells are merged. If the user specifies to keep the intersection between the two bodies, then only the cells belonging to both bodies are kept. If the user specifies that a cell from the first body should be removed from the assembly ("remove" operation), then that cell is removed. Conversely, if the user specifies that a cell from the first body should be kept ("keep" operation), then the selected cell is kept, all other cells from the first body are removed, cells derived exclusively from the second body are kept, and all cells common to both bodies are kept. In practice, the user selects one of the faces of a cell to define which cell is to be kept or removed.

Such existing systems work well as long as the face selected by the user, which necessarily originates in a first body, does not extend on both sides of the other body, i.e., has not been divided or split by a face of the other body.

More specifically, when two parts are assembled, it is often the case that the configuration of the assembly will result in the altering of one or more of the faces of each body. In this case, three kinds of faces are created: 1) faces which are left unchanged in the process ("unchanged" or "non-impacted" faces), 2) faces which are divided into two or more portions ("split" faces), and 3) faces which have the same background surface in the two original bodies. The latter category of faces are merged into one face, and are therefore called "simplified faces". These three types of faces are shown of FIG. 2, where face 26 is an unchanged face, since it did not change from its configuration as face 20 of Body B. Faces 27 and 30 are split faces, since they are each a portion of face 22 of Body B. Faces 27 and 30 lie on opposite sides of Body A. Likewise, faces 28 and 31 are split faces, originating from face 23 of Body A. Face 32 is a simplified face, resulting from the combination of face 24 (Body A) and face 21 (Body B).

In the existing CATIA® system, a user may directly designate only unchanged faces for the application of a remove or keep operation. If the user selects a divided face to designate a cell for a remove or keep function, the operation will be performed on all the cells including a resulting split face. To avoid this, he must first add a feature, such as a hole, to the face. This is a time consuming process which adds unnecessary complexity to the design process, especially since the unnecessary feature (e.g., the hole) must be added prior to the assembly of the body parts, and therefore requires significant forethought which impedes the freedom of the design process. In many assemblies, unchanged faces are not accessible to the user, so the only faces which can practically be selected are split faces. In many cases it is simply more logical for the user to select a split face over an unchanged face. In addition, in many cases, there simply are no unchanged faces in the assembly, so the only faces which can be selected are split faces. Experience shows that at least half of all TRIM operations require the selection, of a split face, and therefore the addition of an unnecessary feature to the split face.

FIG. 3 illustrates the problem. FIG. 3A shows two intersecting bodies, a main one 50 which contains a thin wall 51, and a smaller one 52 which is intended, for example, to strengthen the thin wall. The user wishes to remove the portion 52a of the strengthening body which protrudes on the near side of the wall 51. With the known system, the user has no useful face to select, since all of the faces on the part 52a of the body that is to be removed are split faces. To reach the desired end result shown in FIG. 3C, the user must resort to a by-pass operation, shown in FIG. 3B, in which the user adds a small feature 53 to the geometry of the part of the body which he wishes to remove. In this way, the user is able to tag the particular portion of a body he wishes to remove or keep. This need to add an otherwise useless feature is resented by most designers as being an unnatural and cumbersome operation, and serves to limit the extensive use of the TRIM operation.

There is therefore a need for a system which allows a user to select a split face of a cell to keep or remove in the TRIM operation without the need for the addition of unnecessary parts.

SUMMARY OF THE INVENTION

Accordingly, the present invention provides a system, method and apparatus for allowing a user to perform a TRIM operation without imposing on the user the necessity of adding an otherwise unnecessary geometrical feature to the bodies involved in the operation.

According to an aspect of the invention, this is achieved by making use of another known feature of existing part design systems which consists of storing in the system, for each body, a log describing the history of the topology of the body.

According to an aspect of the invention, the TRIM operation begins with the CutBodies operation, as described above, which divides the two bodies A and B into cells. As stated, the division provides three categories of cells: (I) cells originating exclusively from A; (II) cells originating exclusively from B; and (III) cells that are common to A and B (FIG. 1). According to the invention, the next step consists of classifying all the faces in the assembly resulting from the union of the two bodies ("the A∪B operation") into three categories, according to a comparison of their situation after the CutBodies operation (the "child" situation) with their previous situation (the "parent" situation). This comparison is made using the respective topology logs for their body of origin.

As explained herein, it will be understood that any face in the A∪B log has a parent face in either the topology log for Body A or the topology log for Body B, or in both. On the other hand, a parent face in the A log or the B log may have several children in the A∪B log. In the face classification process, the faces are categorized as described above, i.e., faces that are not impacted by the assembly operation, faces which are split during the operation and which therefore need to be delimited to allow the user to select the appropriate portions of them, and simplified faces.

The next step in the process according to the invention consists of determining whether the user has selected a "keep" or a "remove" operation, and then performing the specified operation. A remove operation will first be described. If the selected face is a simplified face, the user is informed that the selection is in error since it would result in the removal of the entire assembly. If the selected face is a non-impacted face, the system identifies the body cell to which the face belongs and removes it. This was already achieved in the existing system referred to in the Background section. If, however, the selected face is a split face, the method according to the invention consists of using the information in the topology logs to find a cell defined by the selected face and a face having an unrelated parent (parent from a body different from the parent of the selected face). The cell is then removed.

A keep operation is very similar to a remove operation. In a keep operation, the same method is used to identify the selected cell. The group to which the selected cell belongs is noted, and all other cells in that group are removed. The selected cell, and cells from other groups, are kept. Thus, referring to FIG. 1, if cell 10 (Group II) is selected for keeping, cell 10 is kept but cell 11 (Group II) is removed. Cells 12 and 13 (Group I), and cell 14 (Group III) are kept.

DETAILED DESCRIPTION OF THE INVENTION

Figure 4:
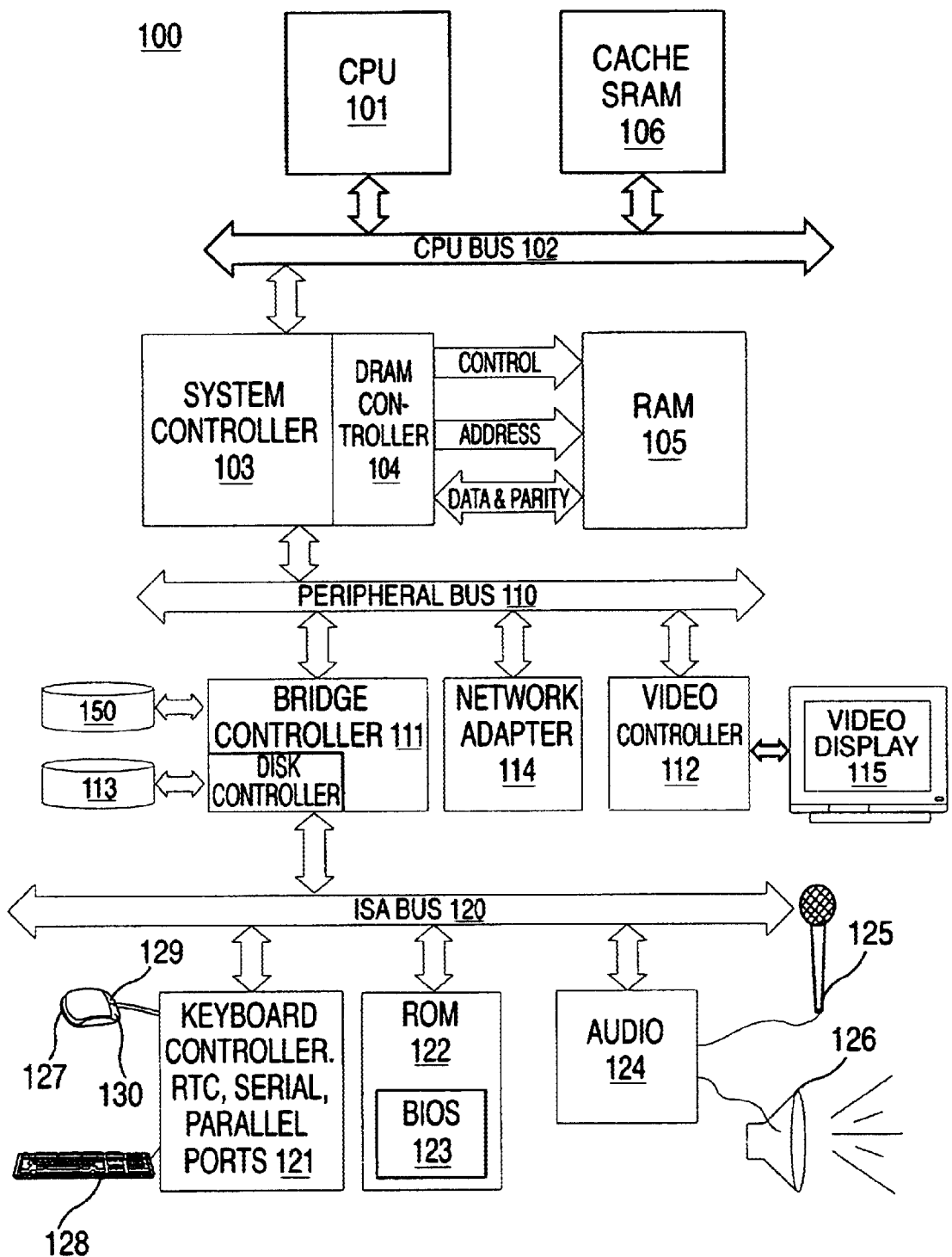
FIG. 4 is a block diagram of a computer system capable of use with the present invention.

Referring to FIG. 4 physical resources of a computer system 100 are depicted which may be programmed in accordance with the present invention. The computer 100 has a central processor 101 connected to a processor host bus 102 over which it provides data, address and control signals. The processors 101 may be any conventional general purpose single-chip or multi-chip microprocessor such as a Pentium® series processor, a K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 113, a video display controller 112 coupled to a video display 115, and a keyboard and mouse controller 121 can be coupled to a bus 120 and controlled by the processor 101. The computer system can include a connection to a computer system network, an intranet or an internet. Data and information may be sent and received over such a connection.

The computer 100 can also include nonvolatile ROM memory 122 to store basic computer software routines. ROM 122 may include alterable memory, such as EEPROM (Electronically Erasable Programmable Read Only Memory), to store configuration data. BIOS routines 123 can be included in ROM 122 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, UNIX, LINUX, the Apple MacOS™ operating system, or other operating system.

An operating system may be fully loaded in the RAM memory 105 or may include portions in RAM memory 105, disk drive storage 113, or storage at a network location. The operating system can provide functionality to execute software applications, software systems and tools of software systems. Software functionality can access the video display controller 112 and other resources of the computer system 100 to provide models of designs on the video computer display 115, in accordance with the present invention.

Figure 5:
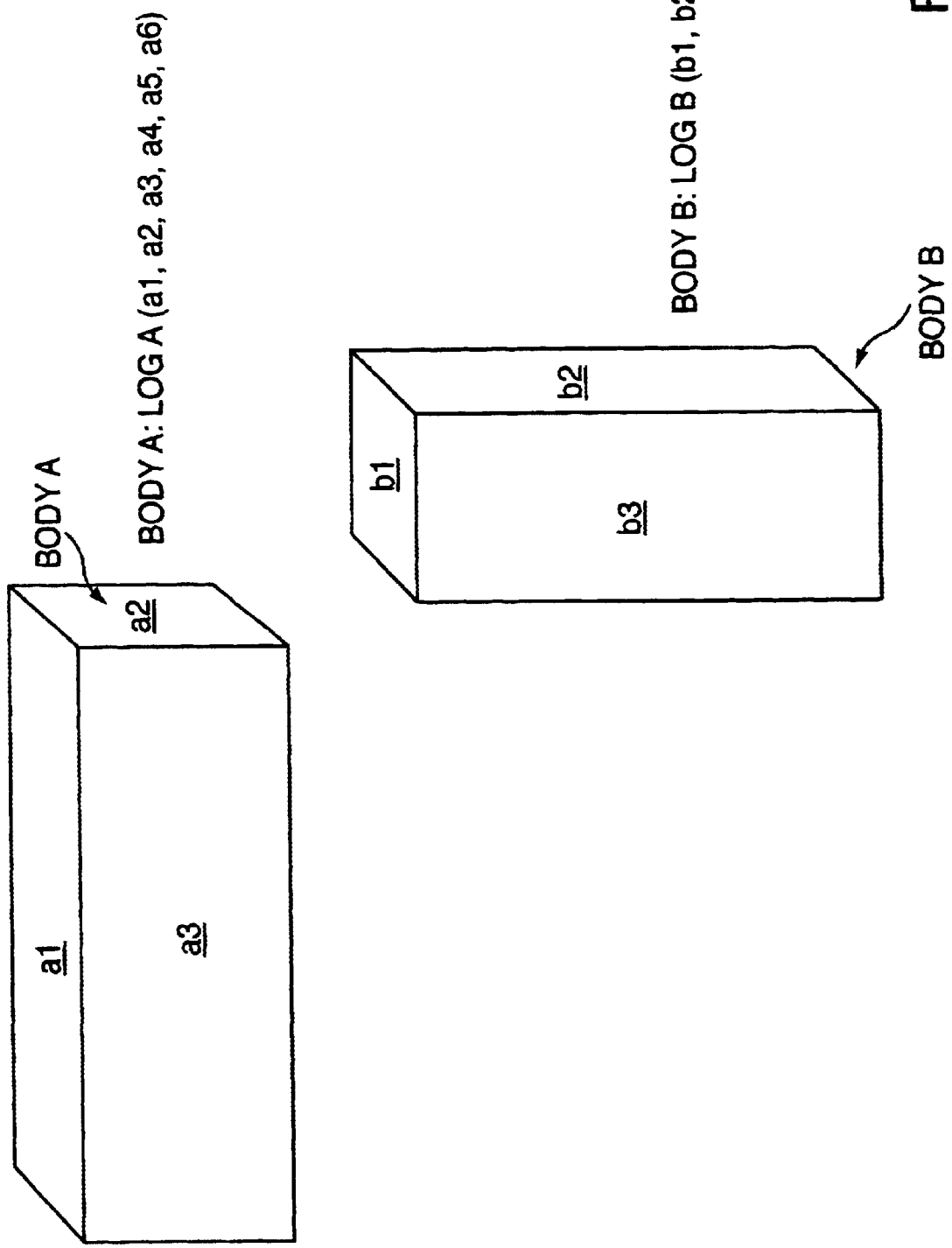
FIG. 5 depicts topology logs for two bodies.
Figure 6:
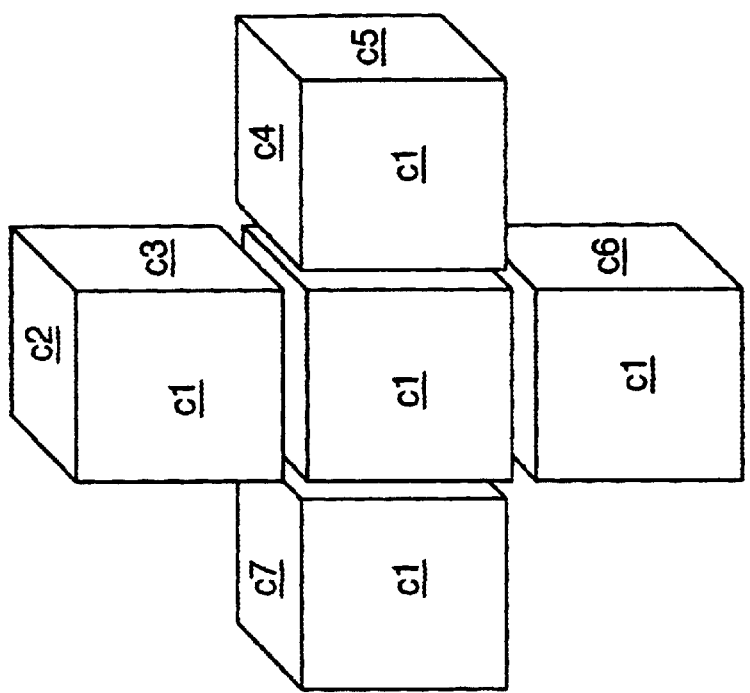
FIG. 6 depicts the topology log for the assembly formed by the merger of the two bodies of FIG. 5.

The concept of a topology log, as used herein, is explained by reference to FIG. 5. As shown therein, the topology log for Body A consists of data for each of the faces of the body, i.e., (a1, a2, a3, a4, a5, a6). Faces a4, a5, and a6 are not shown since they are hidden from view in the figure. Likewise the topology log for Body B consists of its six faces (b1, b2, b3, b4, b5, b6), with hidden faces not shown in the figure. Referring to FIG. 6, the topology log for Body A∪B is indicated, containing data for each face of the body. Thus, for example, face c1 is a simplified face, resulting from the combination of its parents, faces a3 and b3. Face c2 is in unchanged face, and its parent is b1. Face c3 is a split face; its parent is face b2, and its splitting face is a1.

Figure 7:
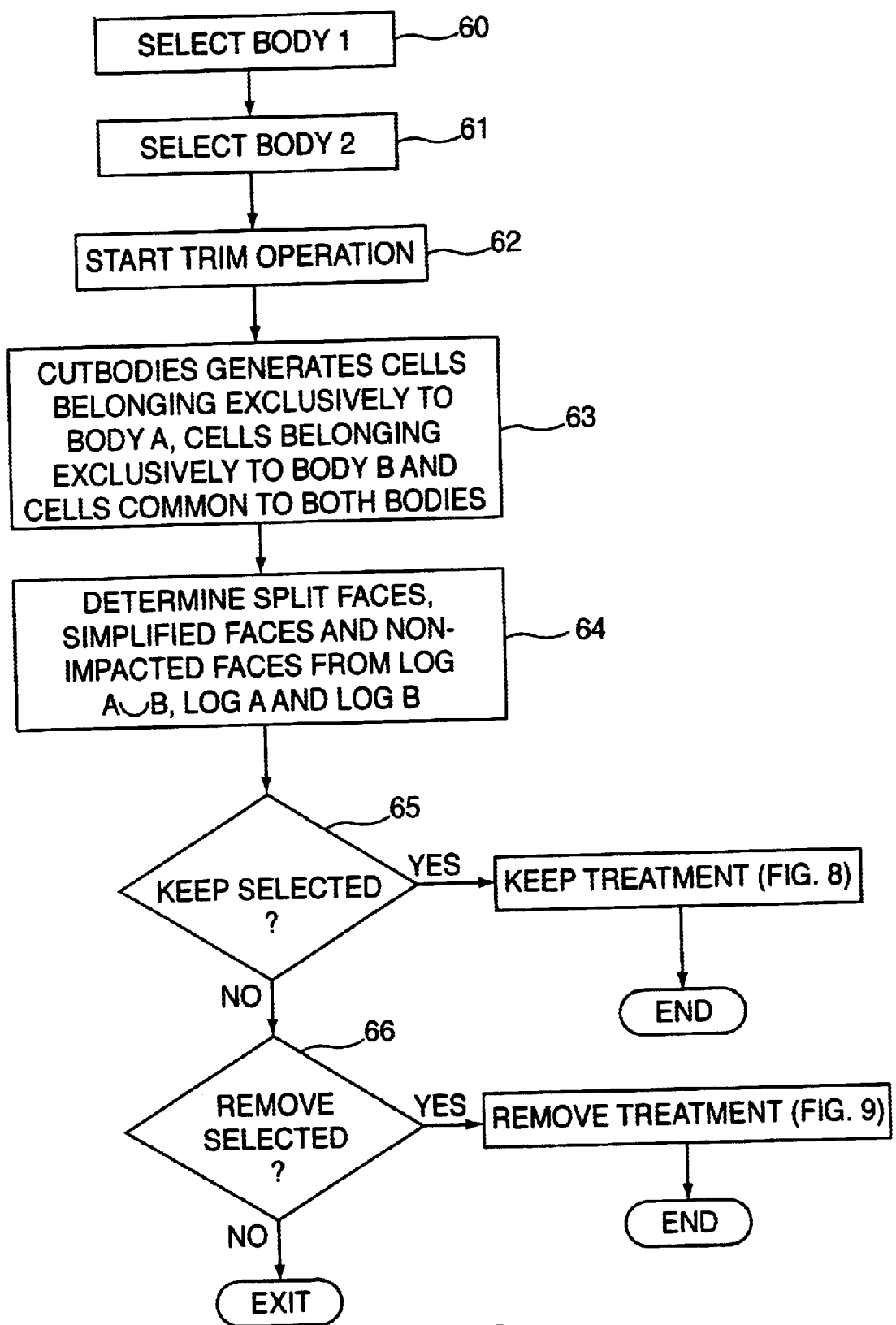
FIG. 7 is a schematic representation of the overall method of the present invention.

Referring to FIG. 7, a flowchart showing the method of the present invention is shown. As depicted therein, the process begins with the selection of the two bodies which will be the subject of the TRIM operation (60, 61). The first step in the Trim operation is the CutBodies operation, which divides the volume of the two bodies into cells delineated by the boundaries between volumes belonging exclusively to Body A, exclusively to Body B, or common to both bodies (62, 63). The topology logs of the two bodies are then compared to determine the history for each face of the body created by the union of Body A and Body B, i.e., the "child" faces (64). The topology log for Body A∪B indicates each child's parent face(s), and thus indicates the body to which the parent face belongs. The next step in the process is to check whether a keep or remove operation has been selected by the user (65, 66). These operations are described in FIGS. 7 and 8.

Figure 8:
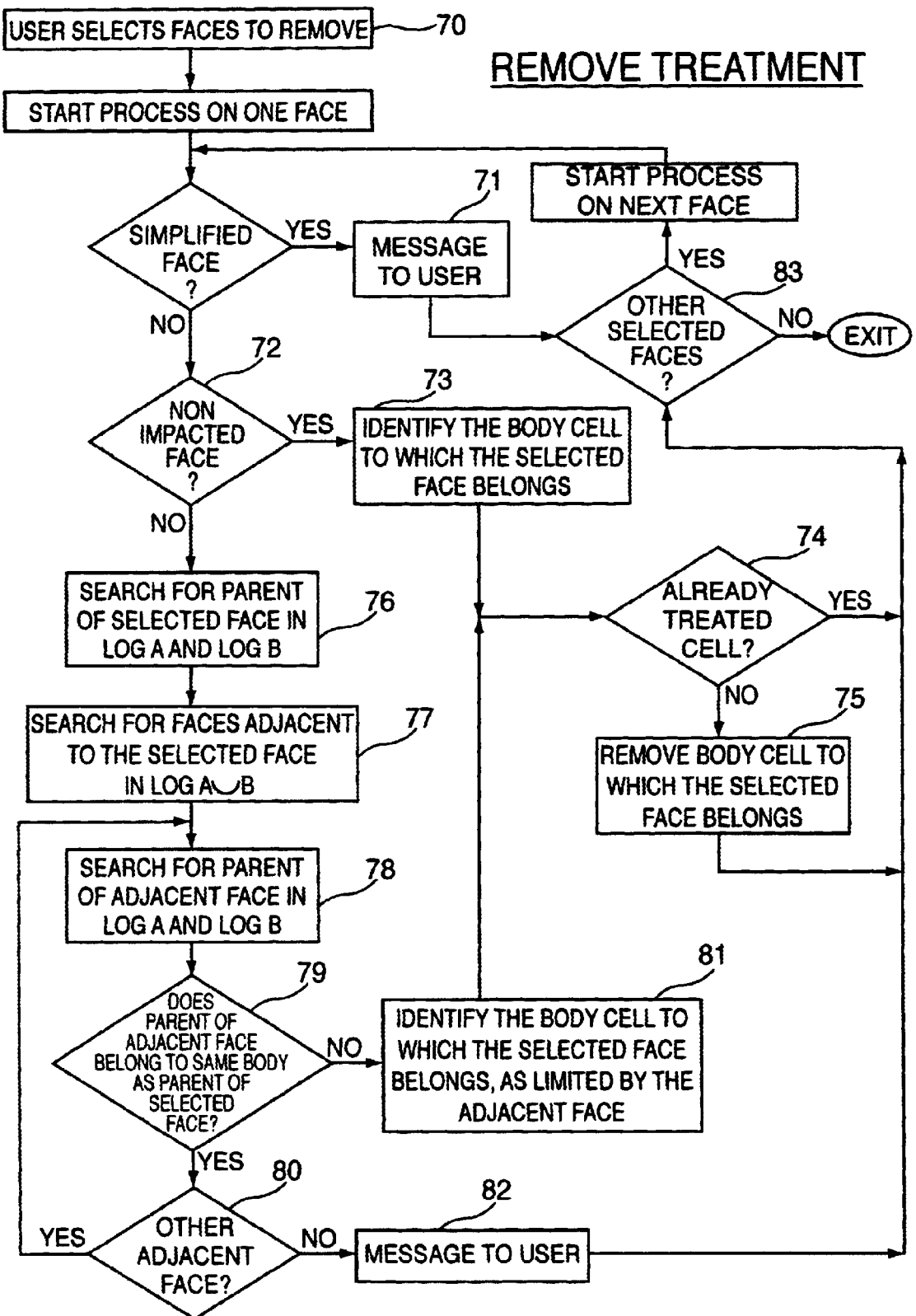
FIG. 8 is a schematic representation of the "remove" operation according to the present invention.

Referring to the flow chart of FIG. 8 and the topology log in FIG. 6, the process of the remove operation is described. The system receives user input indicating which face has been selected for the remove function (70). In the event that the user has selected a simplified face, a message (71) is sent to the user indicating that the selection will result in the removal of the entire assembly. In the event that the user has selected a non-impacted face (72 yes), then the face is used to identify the cell to be removed (73). In the event that the cell has already been flagged for removal, then nothing is done, since the cell will already have been removed, and the system searches for the next selected face (74 yes). If the cell has not been previously tagged for action, then the cell to which the selected face belongs is removed from the assembly (75).

In the event that the user has selected an impacted face (i.e., a split face) (72 no), then the topology logs are searched for the purpose of determining the parent face of the selected face (76). Once this has been determined, the A∪B topology log is searched to find faces adjacent to the selected face (77). Adjacent faces are defined as faces on the outer shell of the assembly that share a common edge with the selected face. Thus, referring to FIG. 6, if the user has selected split face c3, then the faces adjacent to face c3 are simplified face c1, non-impacted face c2, split face c4, and the back face of the assembly, which is not visible in the figure but is identical in shape to simplified face c1. Once the adjacent faces have been identified, the topology logs for Body A and Body B are searched for the purpose of finding the parent(s) of the adjacent face and determining whether any parent(s) of the adjacent face belong to the same body as the parent of the selected face (78, 79). In the event that there is a common parent (79yes), then the method proceeds by skipping to the next adjacent face and again searching the topology logs of Body A and Body B for the purpose of finding the parent(s) of the adjacent face and determining whether any parent(s) of the adjacent face belong to the same body as the parent of the selected face (80). The logs are searched until an adjacent face is found that does not have a same parent as the selected face (79no). That face is then used to define what will be removed, i.e., the cell having the selected face, as bound and limited by the adjacent face having a different parent (81). The identified cell is subsequently removed (75), and the entire process is repeated for the next selected face (83yes), unless no other faces have been selected, in which case the process ends (83no).

It is to be understood here that the foregoing process results in the specific identification of a cell. In the remove operation, once the cell has been identified, it is removed (FIG. 8, step 75). The method of the keep operation is identical in the way that the cell is identified. The keep method (FIG. 9) differs only in step 75 in that once the selected cell has been identified, and its group is determined, it is kept, along with cells from other groups. Non-selected cells from the same group as the selected cell (and therefore the same body) are removed. One may wonder why it is necessary to provide for both a keep and a remove operation, since both accomplish the same result. The reason is that many designers find it more natural to define what they want to keep than what they want to remove.

Figure 1:
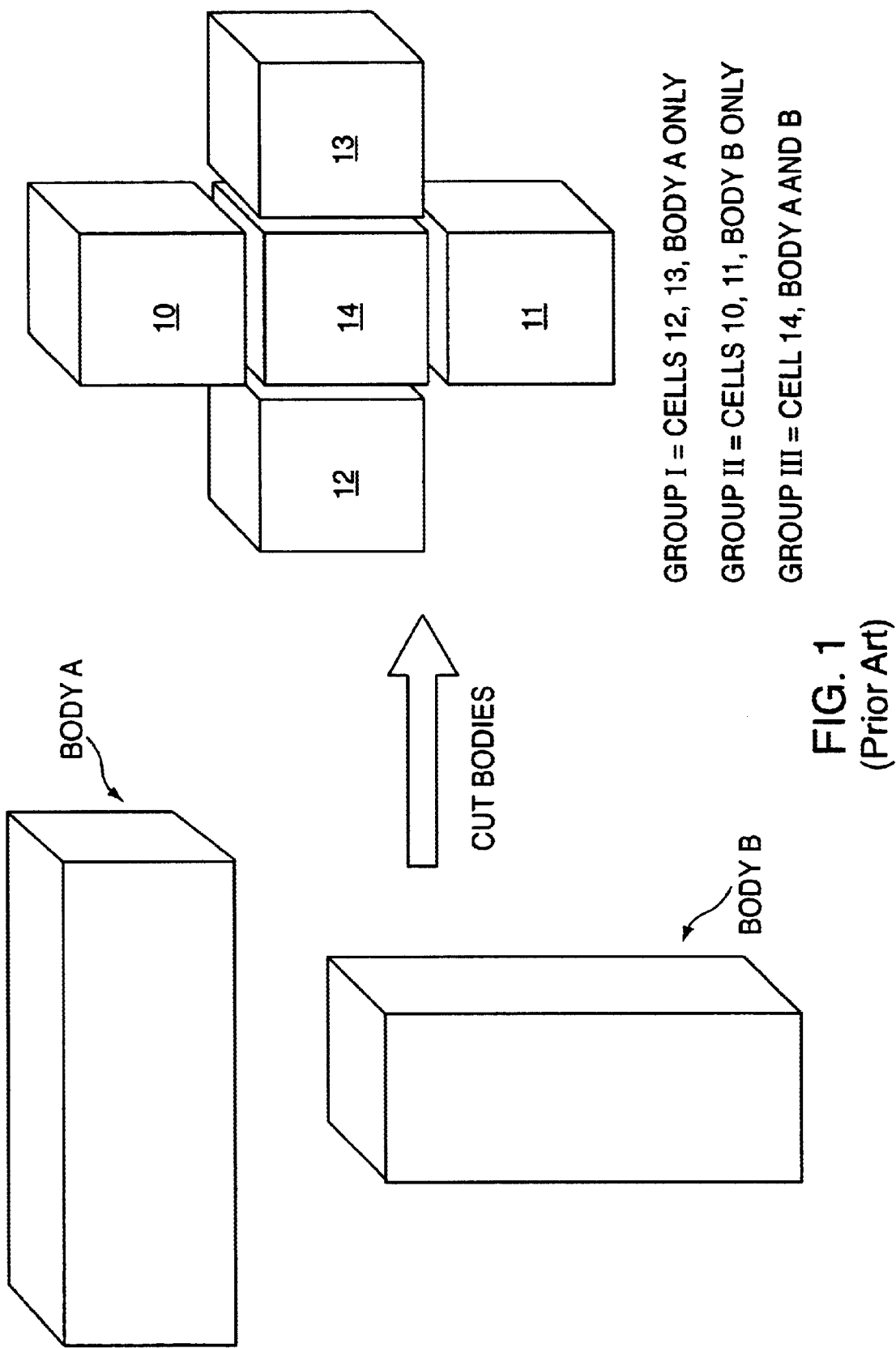
FIG. 1 illustrates the result of the CutBodies operation, where two bodies merged into an assembly are divided into cells according to their body of origin.
Figure 2:
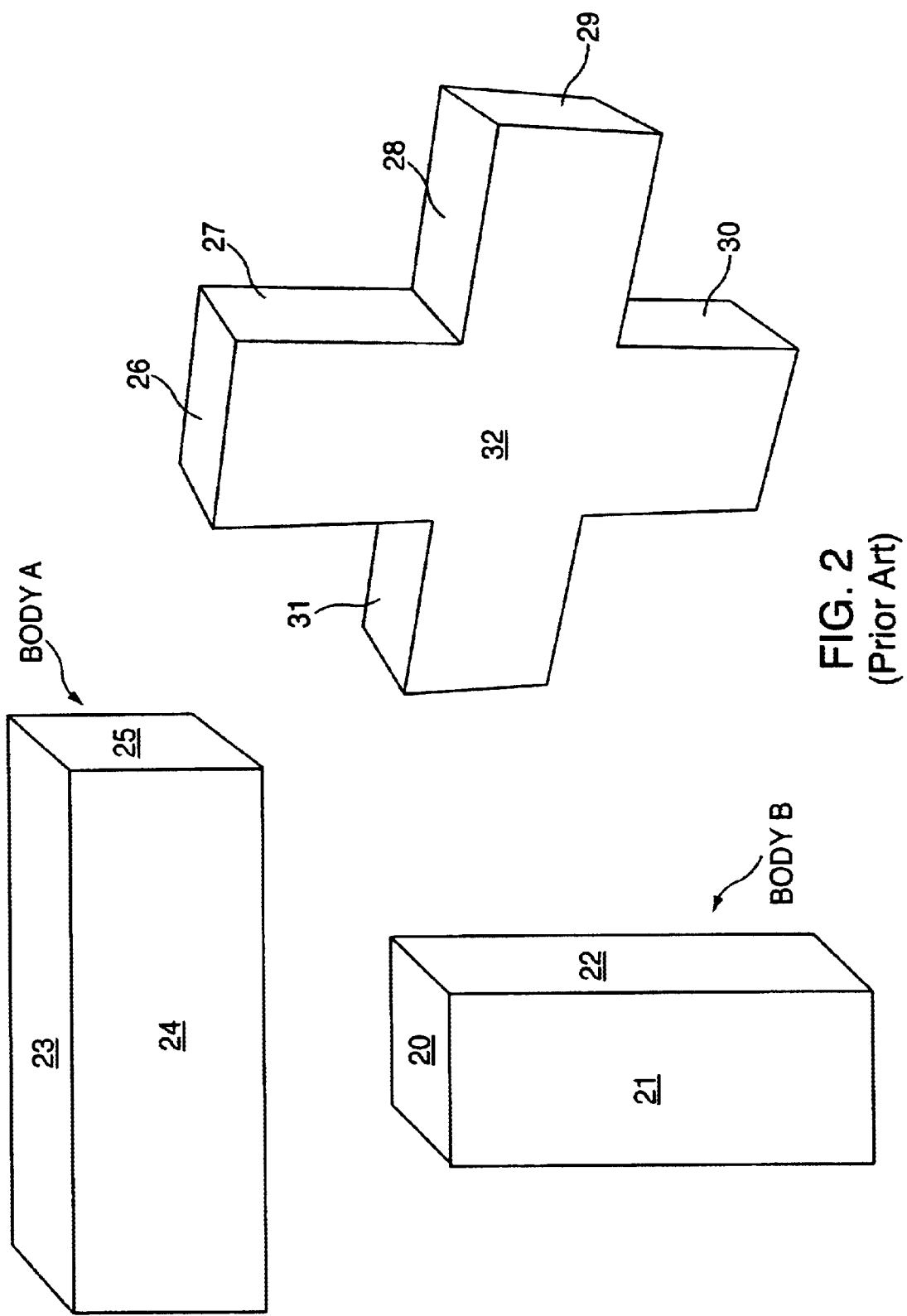
FIG. 2 illustrates the two bodies and their faces prior to the merger of the bodies in an assembly, and the resulting faces after the merger of the two bodies.
Figure 3A:
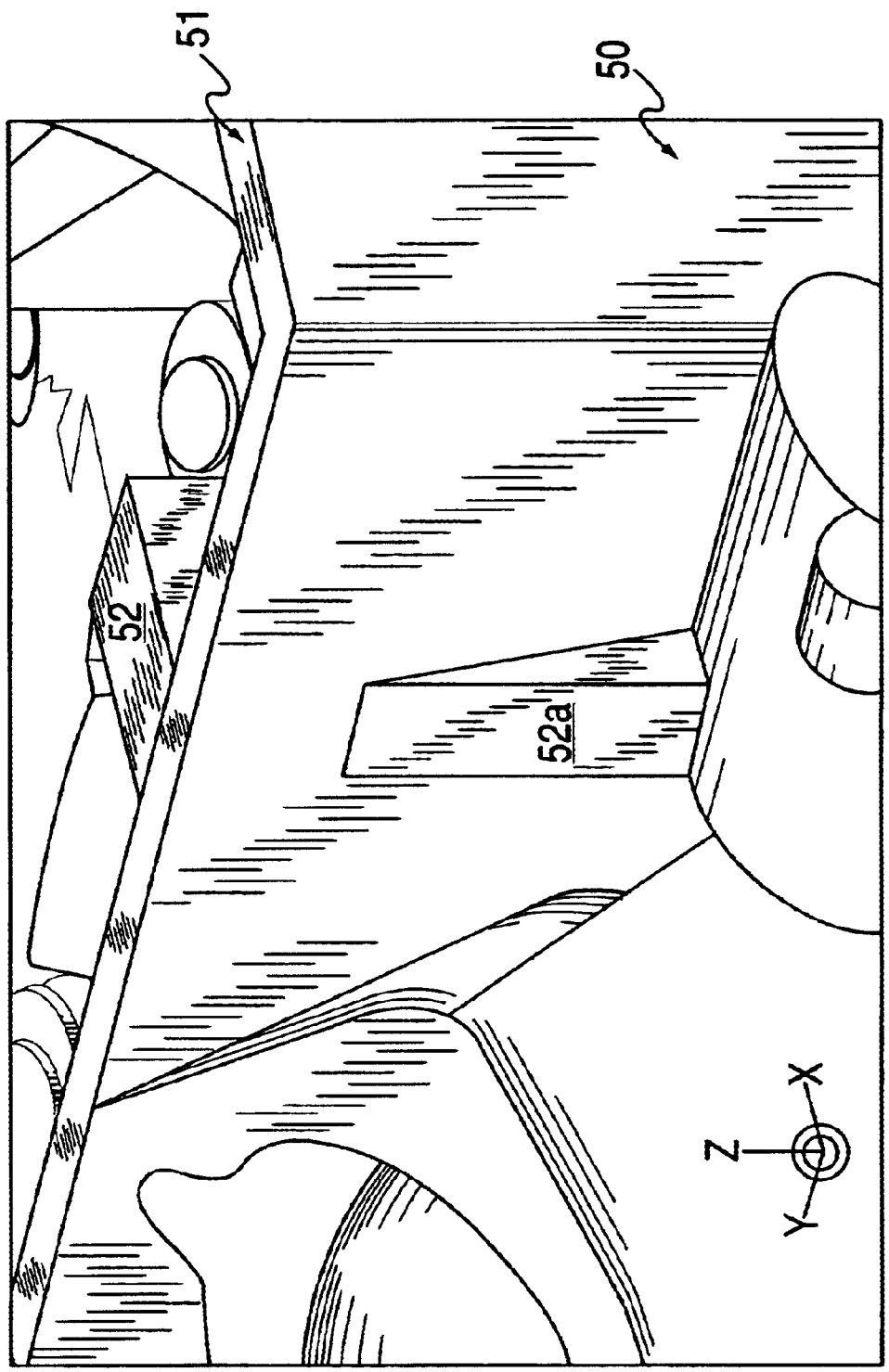
FIG. 3A illustrates an example of the intersection of two bodies in an assembly, a main body and a strengthening body.
Figure 3B:
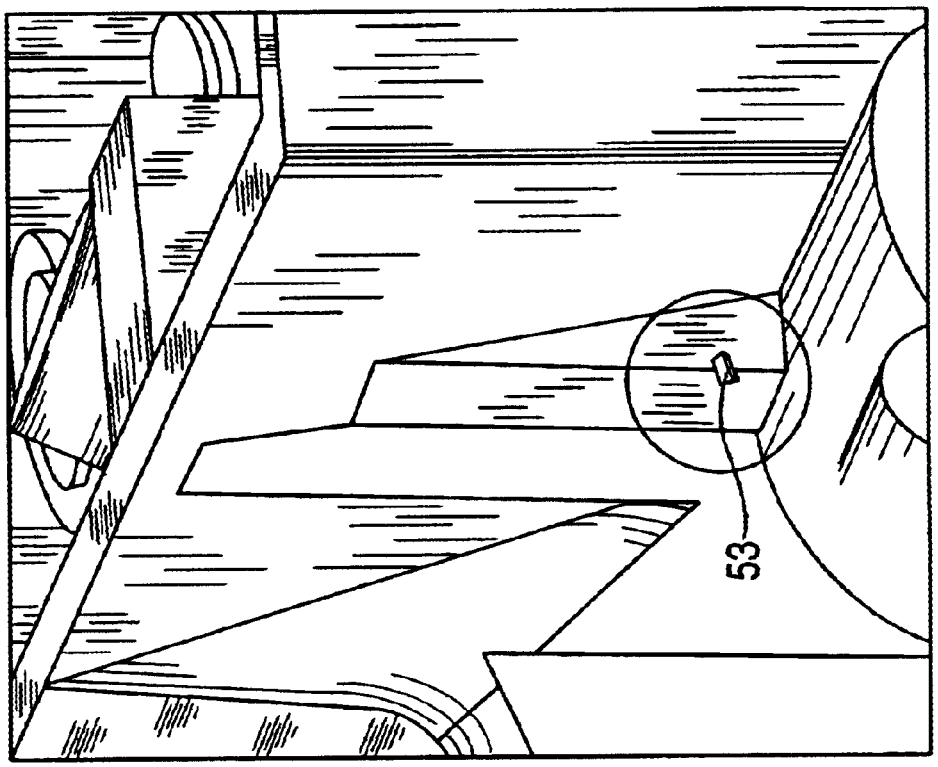
FIG. 3B illustrates the addition of an unnecessary part on the face of the portion of the strengthening body which is to be removed, according to the prior art method.
Figure 3C:
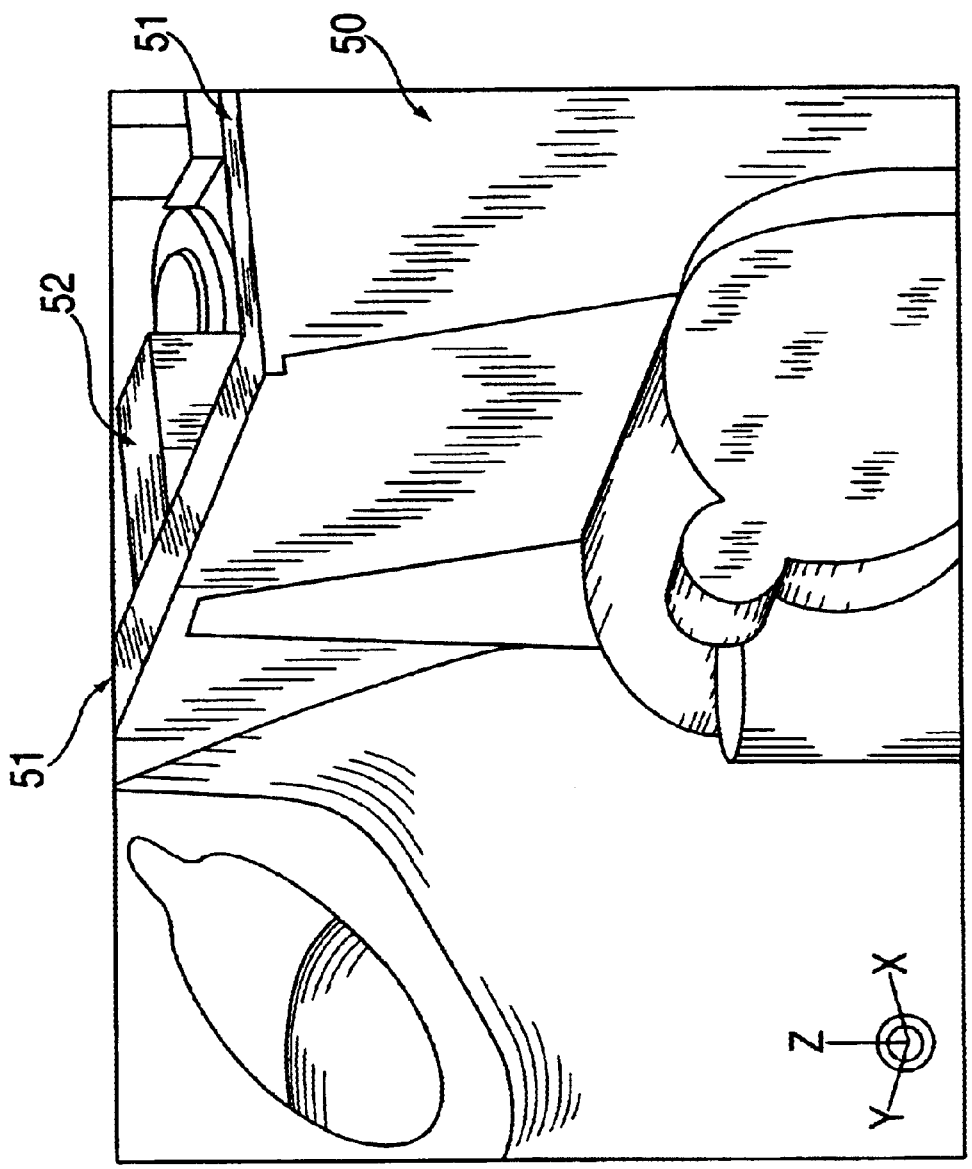
FIG. 3C illustrates the assembly of FIG. 3A after the removal of the undesired portion of the strengthening body.

The invention, as embodied in the remove operation, will now be described with reference to FIGS. 1, 5, 6 and 8. It will be recalled that FIG. 6 is the result of the combination of bodies A and B, shown in FIG. 5. In this example, the user decides that he wishes to remove the top most cell, labeled 10 in FIG. 1. Cell 10 is a Group II cell, since its volume originated solely with Body B (FIG. 1). For the purpose of the illustration, it is assumed that the user selects face c3, shown in FIG. 6, and specifies a remove operation. Since c3 is neither a simplified face, nor an unchanged face, the system will proceed directly to the step of determining the parent of c3 (FIG. 8, step 76). In this case, it will be determined from the topology log that c3's parent is b2, from Body B. The system will then identify all faces that are adjacent to face c3 (FIG. 8, step 77). The adjacent faces are c1, c2, c4, and the back face of the assembly, which is a simplified face identical in shape to c1, and which will be designated as c14 in this example.

The next step will be to select one of the adjacent faces and determine whether the parent of such adjacent face belongs to the same body as the parent of face c3 (FIG. 8, steps 78, 79). Assuming adjacent face c1 is queried first, it will be determined that the parents of c1 are a3 and b3 originating in both bodies A and B. Thus, the response to query 79 of FIG. 8 will be in the affirmative, i.e., face c3 and face c1 each have a parent originating from the same body, i.e., Body B. The same result will be obtained for the query with respect to face c14. Assuming the next face to be checked is c2, it will be determined that the parent of c2 is b1, which originated from Body B. Again, the response to query 79 of FIG. 8 will be in the affirmative, i.e., face c3 and face c2 each have a parent originating from the same body, Body B. Finally, the query turns to adjacent face c4. The parent of c4 is a1. Thus, c4's parent (from Body A) does not originate from the same body as the parent of face c3 (Body B). Therefore, the response to the query of step 79 of FIG. 8 will be in the negative, whereupon the system will identify and tag cell 10 (FIG. 1), which is defined by face c3 as limited by face c4, for subsequent processing (FIG. 8, step 81). In this example, the tagged cell subsequently will be removed (FIG. 8, step 75). The entire process is then repeated if other faces have been selected by the user, (FIG. 8, step 83yes), otherwise, the process ends (FIG. 8, step 83no). In the occasional instance that the query 79 of FIG. 8 is answered in the affirmative for every adjacent face (i.e., the parent of the selected face and the parent of the adjacent face are from the same body), and there are no adjacent faces left to check, then a message will be sent to the user indicating that an error has occurred (FIG. 8, step 82).

Figure 9:
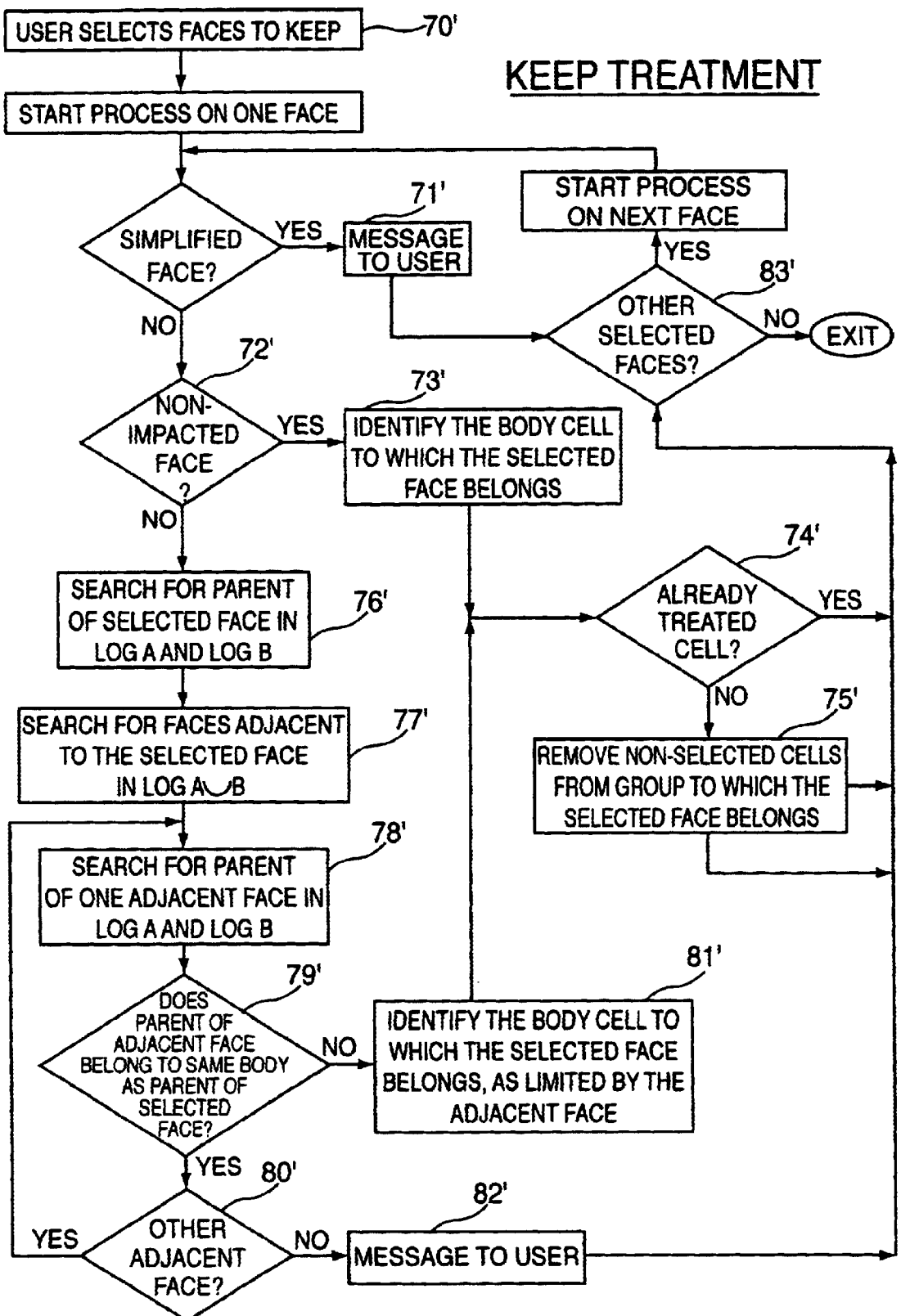
FIG. 9 is a schematic representation of the "keep" operation according to the present invention.

Let us now assume that the user requested a keep function, rather than a remove function. In that case the method of determining the identity of the cell in question will be the same. The difference arises in which cells are removed by the system once the cell at issue is identified. In this example, once cell 10 has been identified, the system will keep cell 10, a Group II cell, but will remove the remainder of the Group II cells, i.e., cell 11 (FIG. 9, step 75). In addition, the system will keep Group I cells (12 and 13), and Group III cells (14).

The invention may be implemented in digital electronic circuitry, or in computer hardware, firmware, software, or in combinations of them. An apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments of the present invention have been described. It will be understood that various modifications may be made without departing from the spirit and scope of the invention. Therefore, other implementations are within the scope of the following claims.

What is claimed is:

1. A computer aided design method comprising:
   obtaining data specifying the physical configuration of a first body and a second body, each of said bodies encompassing a volume of space;
   defining a third body that comprises a combination of the first and second bodies;
   dividing said third body into three categories of cells, said three categories comprising 1) cells encompassing space common to both the first and second bodies, 2) cells encompassing space derived solely from the first body, and 3) cells encompassing space derived solely from the second body;
   storing information obtained from said data defining faces for each of said first, second, and third bodies, wherein said information includes data specifying whether each face of said third body originated from said first or second body;
   receiving input selecting a face of said third body;
   accessing said information to determine whether the selected face originated in said first or second body;
   accessing said information to identify a face adjacent to the selected face which originated from a body other than the body from which the selected face originated; and
   specifying a cell for subsequent processing defined by said selected face and said adjacent face.

2. The method of claim 1 further comprising:
   receiving input specifying that said cell be removed from said third body; and
   removing said cell from said third body.

3. The method of claim 1 further comprising:
   receiving input from a user specifying that said cell be kept as part of said third body; and
   removing from said third body all cells within the category in which said cell specified for further processing belongs, except said specified cell.

4. A software control method comprising:
   a) displaying an assembly comprised of the combination of a first body and a second body, wherein said display indicates graphically the portions of said assembly that originated from said first body;
   b) receiving input selecting a face of said object;
   c) determining whether parent of the selected face originated in said first body or said second body, and storing said information;
   d) determining a set of faces of said object which are adjacent to said selected face;
   e) searching said set of adjacent faces until an adjacent face is found having a parent that does not originate in the same body from which the parent of said selected face originated;
   f) defining a cell of said assembly as a portion of said assembly bound by said selected face and said adjacent face found in step e).

5. The method of step 4, further comprising:
   receiving input indicating that said cell be removed from said assembly; and
   removing said cell from said assembly.

6. Computer executable code stored on a computer readable medium, the code comprising means for causing a computer to take steps comprising:
   obtaining data specifying the physical configuration of a first body and a second body, each of said bodies encompassing a volume of space;

defining a third body that comprises a combination of the first and second bodies;

dividing said third body into three categories of cells, said three categories comprising 1) cells encompassing space common to both the first and second bodies, 2) cells encompassing space derived solely from the first body, and 3) cells encompassing space derived solely from the second body;

storing information obtained from said data defining faces for each of said first, second, and third bodies, wherein said information includes data specifying whether each face of said third body originated from said first or second body;

receiving input selecting a face of said third body;

accessing said information to determine whether the selected face originated in said first or second body;

accessing said information to identify a face adjacent to the selected face which originated from a body other than the body from which the selected face originated; and specifying a cell for subsequent processing defined by said selected face and said adjacent face.

7. The computer executable code of claim 6, said code further comprising means for causing a computer to take steps comprising:

accepting input specifying that said cell be removed from said third body; and removing said cell from said third body.

8. The computer executable code of claim 6, said code further comprising means for causing a computer to take steps comprising:

accepting input specifying that said cell be kept as part of said third body; and removing from said third body all cells within the category in which said cell specified for further processing belongs, except said specified cell.

9. Computer executable code stored on a computer readable medium, the code comprising means for causing a computer to take steps comprising:

a) displaying an assembly comprised of the combination of a first body and a second body, wherein said display indicates graphically the portions of said assembly that originated from said first body;

b) receiving input selecting a face of said assembly;

c) determining whether the selected face originated in said first body or said second body, and storing said information;

d) determining a set of faces of said assembly which are adjacent to said selected face;

e) searching said set of adjacent faces until an adjacent face is found that does not originate in the same body from which said selected face originated;

f) defining a cell of said assembly as a portion of said assembly bound by said selected face and said adjacent face found in step e).

10. An article of manufacture comprising:

a computer useable medium having computer readable program code means embodied therein for causing a computer system to display an assembly comprised of the combination of a first body and a second body on a display device, wherein said display indicates graphically the portions of said assembly that originated from said first body, the computer readable program code means in said article of manufacture comprising:

a) computer readable program code means for causing the computer to accept input selecting a face of said assembly;

b) computer readable program code means for causing the computer to determine whether the selected face originated in said first body or said second body, and for causing the computer to store said information;

c) computer readable program code means for causing the computer to determine a set of faces of said assembly which are adjacent to said selected face;

d) computer readable program code means for causing the computer to search said set of adjacent faces until an adjacent face is found that does not originate in the same body from which said selected face originated;

e) computer readable program code means for causing the computer to define a cell of said assembly as a portion of said assembly bound by said selected face and said adjacent face found in step d).

11. The article of manufacture of claim 10, further comprising computer readable program code means for causing the computer to accept user input indicating that said cell be removed from said assembly; and for causing the computer to remove said cell from said assembly.

12. A computer data signal embodied in a digital data stream comprising data including a representation of an assembly which is composed of the entire volume of a first body and a portion of the volume of a second body, wherein the computer data signal is generated by a method comprising the steps of:

obtaining data specifying the physical configuration of said first body and said second body, each of said bodies encompassing a volume of space;

defining a third body that comprises a combination of the first and second bodies;

dividing said third body into three categories of cells, said three categories comprising 1) cells encompassing space common to both the first and second bodies, 2) cells encompassing space derived solely from the first body, and 3) cells encompassing space derived solely from the second body;

storing information obtained from said data defining faces for each of said first, second, and third bodies, wherein said information includes data specifying whether each face of said third body originated from said first or second body;

accessing data selecting a face of said third body;

accessing said information defining faces to determine whether the selected face originated in said first or second body;

accessing said information defining faces to identify a face adjacent to the selected face which originated from a body other than the body from which the selected face originated;

specifying a cell defined by said selected face and said adjacent face;

receiving input specifying whether said cell should be kept or removed from said third body, if said specification is to remove said cell, then removing said cell from said third body to obtain-said assembly; and if said specification is to keep said cell, then removing from said third body all cells within the category in which said cell belongs, except said specified cell, to obtain said assembly.

13. A computer aided design method comprising:
a) obtaining a first set of data specifying the physical configuration of a first body, said first set of data comprising a set of faces of said first body;
b) obtaining a second set of data specifying the physical configuration of a second body, said second set of data comprising a set of faces of said second body;
c) defining a third set of data specifying a third body that comprises a combination of the first and second bodies, said third set of data comprising a set of faces of said third body, and said third set of data indicating, for each face of said third body, the face of the first or second body from which the face of the third body originated;
d) receiving input selecting a face of said third body;
e) determining the face of the first or second body from which said selected face of said third body originated;
f) identifying a face of said third body, adjacent to the selected face, which originated in a face belonging to a body other than the body corresponding to the face from which the selected face originated; and
g) specifying for subsequent processing a portion of said third body defined by said selected face and said adjacent face.

14. The method of claim 13 further comprising:
receiving input instructing that said portion of said third body specified for further processing be removed from said third body; and
removing said portion from said third body.

15. The method of claim 13 further comprising:
receiving input instructing that said portion of said third body specified for further processing be kept as part of said third body;
determining whether said portion of said third body originated in said first body or said second body; and
removing from said third body all portions of said third body originating solely in the body corresponding to the portion of said third body specified for further processing, except said portion specified for further processing.

16. Computer executable code stored on a computer readable medium, the code comprising means for causing a computer to take steps comprising:
a) obtaining a first set of data specifying the physical configuration of a first body, said first set of data comprising a set of faces of said first body;
b) obtaining a second set of data specifying the physical configuration of a second body, said second set of data comprising a set of faces of said second body;
c) defining a third set of data specifying a third body that comprises a combination of the first and second bodies, said third set of data comprising a set of faces of said third body, and said third set of data indicating, for each, face of said third body, the face of the first or second body from which the face of the third body originated;
d) receiving input selecting a face of said third body;
e) determining the face of the first or second body from which said selected face of said third body originated;
f) identifying a face of said third body, adjacent to the selected face, which originated in a face belonging to a body other than the body corresponding to the face from which the selected face originated; and
g) specifying for subsequent processing a portion of said third body defined by said selected face and said adjacent face.

17. The computer executable code of claim 16, said code further comprising means for causing a computer to take steps comprising:
receiving input instructing that said portion of said third body specified for further processing be removed from said third body; and
removing said portion from said third body.

18. The computer executable code of claim 16, said code further comprising means for causing a computer to take steps comprising:
receiving input instructing that said portion of said third body specified for further processing be kept as part of said third body;
determining whether said portion of said third body originated in said first body or said second body; and
removing from said third body all portions of said third body originating solely in the body corresponding to the portion of said third body specified for further processing, except said portion specified for further processing.

19. A computer data signal embodied in a digital data stream comprising data including the representation of an assembly, said assembly comprising the combination of a first body and a second body, wherein a portion of said assembly representing a piece of one of the first or second bodies has been tagged for subsequent processing, said piece originating solely from one of the first or second bodies, wherein the computer data signal is generated by a method comprising the steps of:
a) obtaining a first set of data specifying the physical configuration of a first body, said first set of data comprising a set of faces of said first body;
b) obtaining a second set of data specifying the physical configuration of a second body, said second set of data comprising a set of faces of said second body;
c) defining a third set of data specifying a third body that comprises a combination of the first and second bodies, said third set of data comprising a set of faces of said third body, and said third set of data indicating, for each face of said third body, the face of the first or second body from which the face of the third body originated;
d) receiving input selecting a face of said third body;
e) determining the face of the first or second body from which said selected face of said third body originated;
f) identifying a face of said third body, adjacent to the selected face, which originated in a face belonging to a body other than the body corresponding to the face from which the selected face originated; and
g) specifying for subsequent processing a portion of said third body defined by said selected face and said adjacent face.

* * * * *